United States Patent [19]

Aimar

[11] 4,231,485
[45] Nov. 4, 1980

[54] CAP AND FILLER ASSEMBLY FOR FUEL TANKS OF AUTOMOTIVE VEHICLES

[75] Inventor: Michele Aimar, Turin, Italy

[73] Assignee: ITW Fastex Italia S.p.A., Turin, Italy

[21] Appl. No.: 78,986

[22] Filed: Sep. 26, 1979

[30] Foreign Application Priority Data

Sep. 25, 1978 [IT] Italy ............................... 28020 A/78

[51] Int. Cl.³ ............................................. B65D 55/14
[52] U.S. Cl. ....................................... 220/210; 70/165
[58] Field of Search ............... 220/210, 203, 303, 304; 70/165–172

[56] References Cited

U.S. PATENT DOCUMENTS

| | | | |
|---|---|---|---|
| 4,083,209 | 4/1978 | Sloan, Jr. ................................ | 70/165 |
| 4,132,091 | 1/1979 | Aro et al. .......................... | 220/210 X |
| 4,164,302 | 8/1979 | Gerdes .................................. | 220/210 |

*Primary Examiner*—George T. Hall
*Attorney, Agent, or Firm*—J. R. Halvorsen; T. W. Buckman

[57] ABSTRACT

A cap and filter assembly for fuel tanks of automotive vehicles is provided in which the cap comprises two hollow cylindrical members of plastic material. One of said members has at one end a handle and a circular flange of the closure of the filler opening and at the other end first snap means for engaging and retaining a cylinder lock and second snap means for receiving a complementary portion of the other of said hollow cylinder members. The engagement between the two members is established by means of mating square cross-section portions of said members.

4 Claims, 8 Drawing Figures

CAP AND FILLER ASSEMBLY FOR FUEL TANKS OF AUTOMOTIVE VEHICLES

The present invention relates generally to caps for fillers of fuel tanks of automotive vehicles and, more particularly, to a cap and filler assembly of a comparatively simple conception and low cost.

At present caps of this type are generally metallic and are applied to the filler by means of a bayonet joint or a threaded engagement. These caps require comparatively high manufacturing costs and, as a result, are comparatively expensive especially where a lock for locking the cap in a closed position is incorporated in them.

More particularly the cap and filler assembly for fuel tanks of automotive vehicles according to the present invention is characterized in that the cap comprises substantially a pair of hollow cylindrical members of plastic material, one of which has at one end a control means and a circular flange for the closure of the filler opening and at the other end first snap means for engaging and retaining a cylinder lock and second snap means for receiving a complementary portion of the other of said hollow cylindrical members, said one hollow cylindrical member having also another cylindrical wall integrally formed with said flange and terminating with a substantially square cross-section, whereas said other hollow cylindrical member has at one end snap means for engagement with the snap means of said one hollow cylindrical member and at the other end an integral cap portion having the same square cross-section as the square cross-section portion of said one hollow cylindrical member and a seat for receiving the end of said cylinder lock, both of said hollow cylindrical members, when connected by snap action to each other being capable of being rotated with respect to each other by said cylinder lock, and the filler comprises a diaphragm provided with an opening having the same square cross-section as the square cross-section of the portions of the pair of members forming said cap.

According to a feature of the present invention the portions of substantially square cross-section of the first and second cap members and of filler have a square cross-section with rounded corners, the diagonally opposed ones of the rounded corners having a different curvature radius.

According to another feature of the present invention the filler is provided on the inner wall thereof with stop means in order to limit the rotation of the pair of cap members to an angle of 45°.

The invention will be described now in greater detail with reference to a preferred embodiment thereof, given merely by way of example and therefore in no limiting sense, which is illustrated in the accompanying drawings in which.

Figure 1:
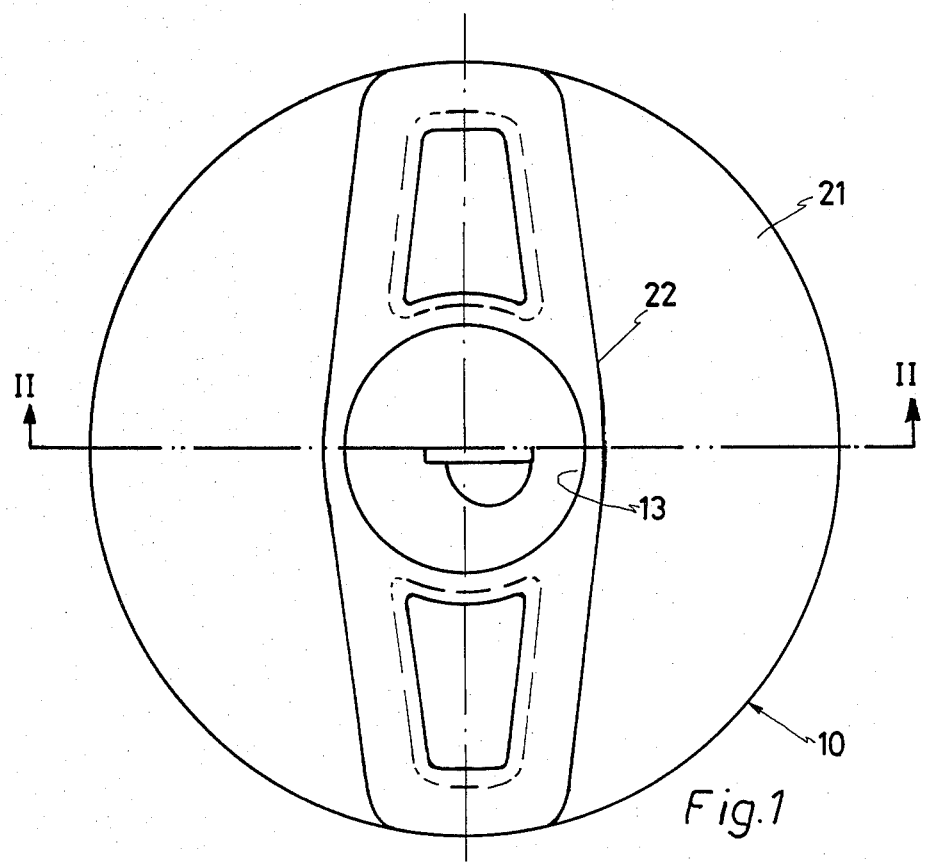
FIG. 1 shows a top plan view of the first member forming the cap.
Figure 2:
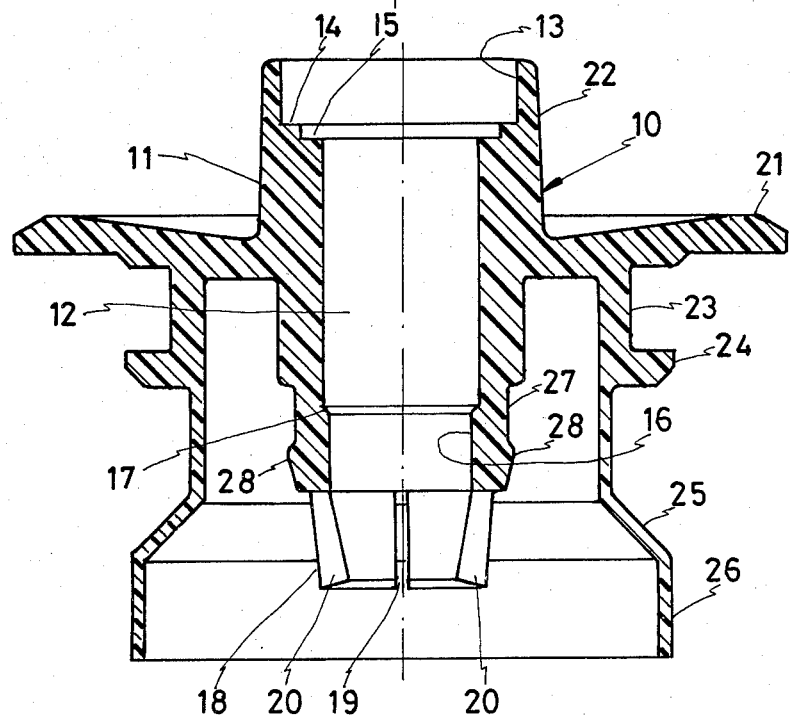
FIG. 2 is a cross-sectional view of the first cap member taken along line II—II of FIG. 1.

Referring now to FIGS. 1 and 2, there is shown the first member forming the cap of the filler. This member, designated generally by reference numeral 10, comprises a tubular body 11 having a hole 12 intended to receive a cylinder lock (not shown). The hole 12 has a mouth 13 with a stepped widening forming two shoulders 14 and 15 for the abutment of the head of the cylinder lock. At the opposite end the hole has reduced diameter portion 16 forming a shoulder 17 also intended for the abutment of the cylinder lock and terminates in a frusto-conical extension 18 having four slots 19 spaced 90° apart from each other which define four arcuate segments 20. The whole member 10 is made of plastic material whereby the four arcuate segments 20 have a certain amount of resiliency and can be bent and then resume their original position. The purpose of said four arcuate segments 20 will be made clear hereinafter. The body 11 has a circular flange 11 projecting radially and intended to cover the filler mouth and at the other end a projecting portion 22 extending along the whole diameter of the flange 21 so as to serve as a handle to rotate the body 11.

Figure 5:
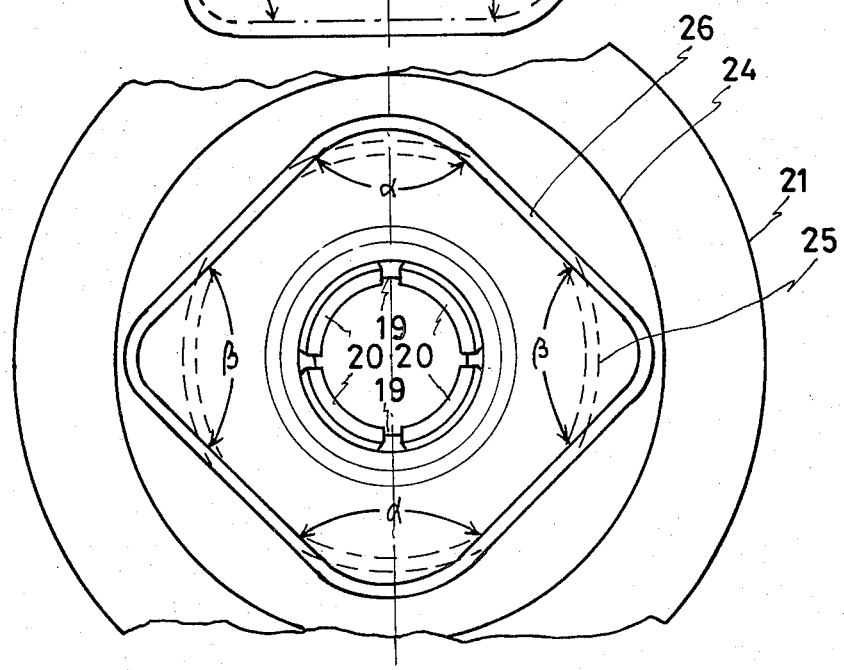
FIG. 5 is a bottom plan view of the first cap member.

Extending from the flange 21 coaxially to the body 11 is an outer cylindrical wall 23 having intermediately a radially extending flange 24. At the opposite end the cylindrical wall joins by means of a connecting section 25 a wall 26 which is substantially square in cross-section. As can be better seen in FIG. 5 the cross-section of the wall portion 26 is square with rounded corners, the diagonally opposed corners having a different radius of curvature. For example the diagonally opposed corners $\alpha$ may have a radius of curvature twice the diagonally opposite corners $\beta$. The purpose of this asymmetry will be explained hereinafter.

On the outer surface of the body 11 at the end having the arcuate segments 20 there is provided a reduced diameter section 27 and at the edge of this end there is provided a circumferential projection operating as a snap engagement means for the second cam member, and defining thus a groove.

Figure 3:
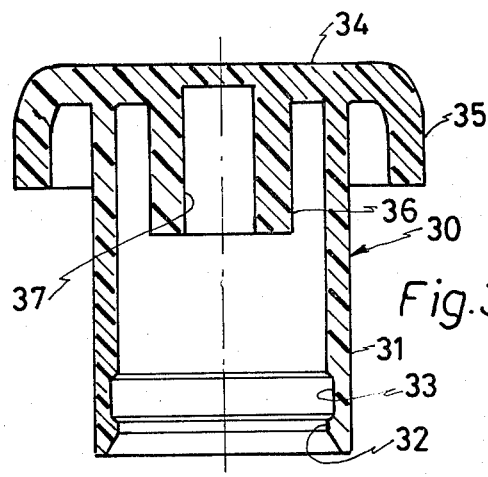
FIG. 3 is a cross-sectional view of the second cap member taken along line III—III of FIG. 4.
Figure 4:
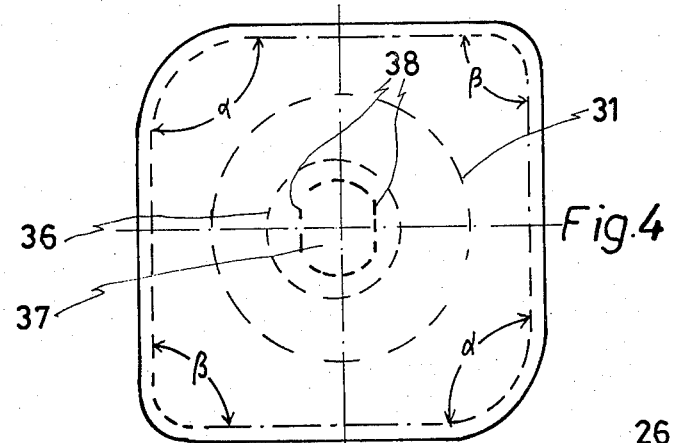
FIG. 4 is a top plan view of the second cap member.

In FIGS. 3 and 4 there is shown the second member forming the cap, designated generally by reference numeral 30. This member comprises a tubular body 31 having an open end whose inner surface has an inner annular projection 32 serving as a snap engagement means for the first member forming the cap as will be explained hereinafter. Close behind this inner annular projection 32 there is provided a groove 33 intended to receive the circumferential projection 28 of the first member forming the cap. The other end of the body 31 is closed by a plug 34 integral with the body 31 and having a cross-section substantially the same as that of the portion 26 of the member 10, i.e. a square cross-section with rounded corners, the diagonally opposed corners $\alpha$ having a radius of curvature twice the diagonally opposed corners $\beta$. The plug 34 has back bent edges 35 and a central hub 36 which is coaxial to the body 31 and has a central hole 37 with two flat opposite faces 38. This hole 37 is intended to receive the end of the cylinder lock, as will be explained hereinafter. The member 30 is also of plastic material like the member 10.

Figures 6, 7:
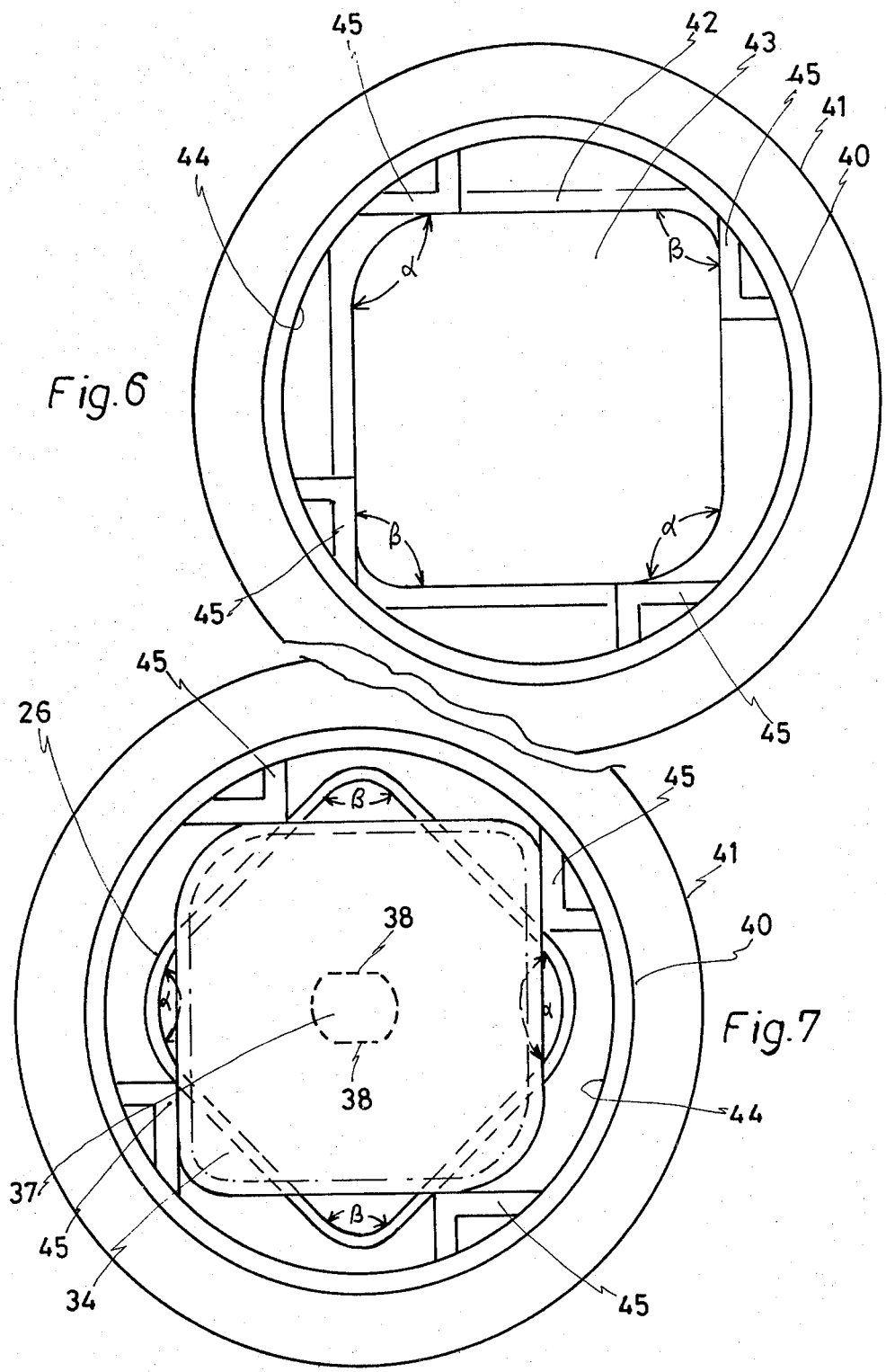
FIG. 6 is a rear view of the filler.
FIG. 7 is a rear view of the filler with the cap applied and the lock in a closed position.
Figure 8:
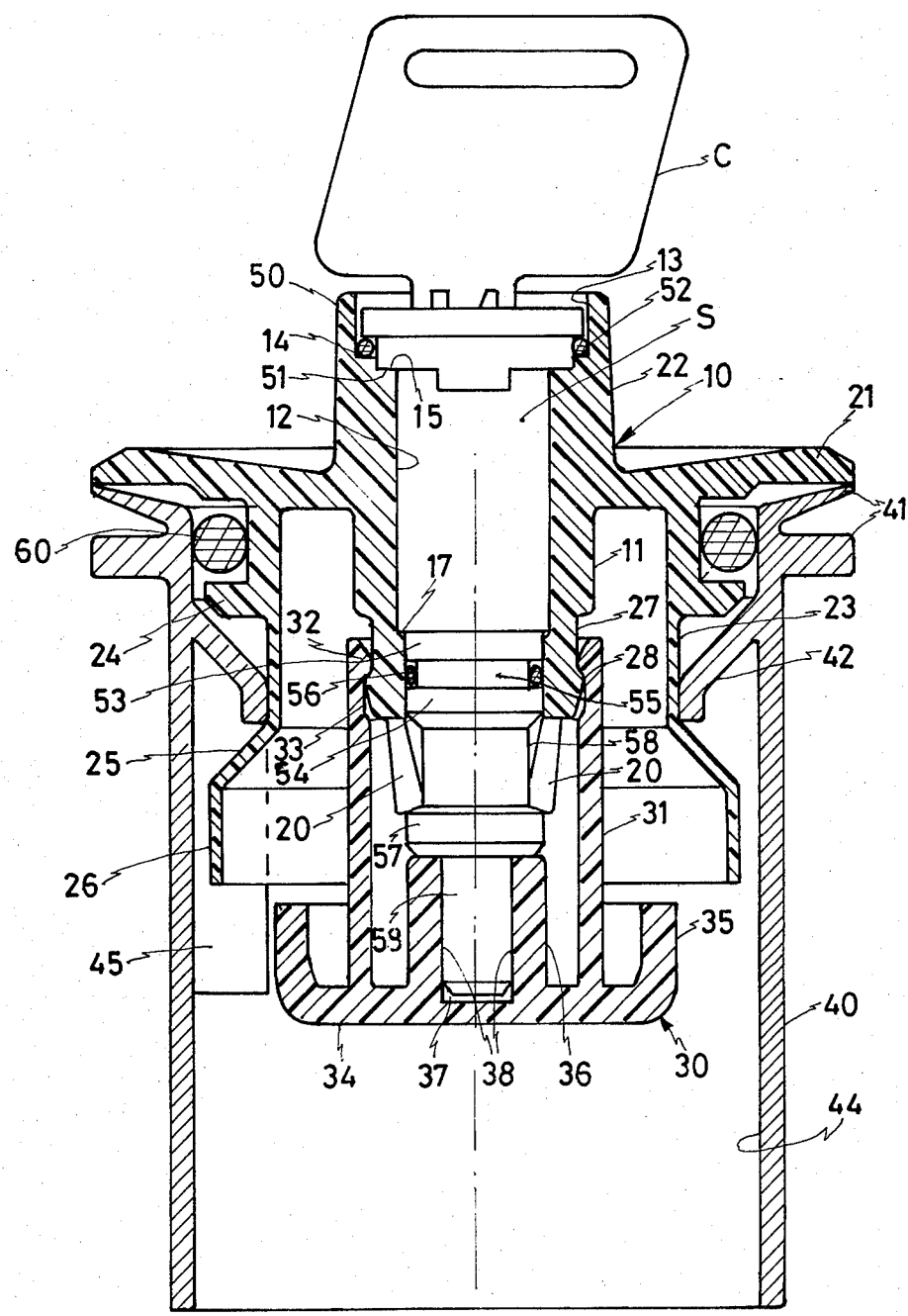
FIG. 8 is a cross-sectional view of the cap and filler assembly with the lock in an open position.

Referring now to FIGS. 6 and 8, there is shown the filler 40 having at the free end a double flange 41 and inside a diaphragm 42 having an opening 43 with a substantially square cross-section with rounded corners the same as the cross-section of the portion 34 of the member 30. Here again the opposite corners α have a radius of curvature twice that of the diagonally opposed corners β. In addition, on the inner wall 44 of the filler 40 there are provided four stops 45 approximately at the four angles of the square opening 43 with rounded corners which serve to limit the rotation of the member 10 and member 30 to 45°.

The operation of the cap and filler assembly for fuel tanks is the following.

First of all a cylinder lock S is inserted into the cap member 10 so that its cylinder enters the hole 12 in the member 10. This lock S has a stepped head forming two sequential shoulders 50 and 51 which abut the shoulders 14 and 15 of the hole 12 respectively with an annular gasket 52 interposed between the shoulders 50 and 14. The cylinder of the lock S abuts with its other end the shoulder 17 of the hole 12 of the member 11. The actuator member or stem of the cylinder lock, which extends from the cylinder has two collars 53 and 54 forming a groove 55 between them in which an annular gasket 56 is inserted which acts as a seal against the wall 16 of the hole 12 of the member 10 and then a third collar 57 forming between itself and the collar 54 a more extended groove 58 intended to receive the arcuate segments 20 projecting from the body 11 of the member 10. Once these arcuate segments 20 have been expanded by the collar 57 passing through them, they will resiliently snap into the groove 58 and firmly hold in position the cylinder lock S in the member 10 forming the cap.

At this point the cap member 30 is inserted so that the pin 59 of the cylinder lock having two flat faces is inserted into the hole 37 in the member 30 of the pin. Simultaneously the inner annular projection 32 of the body 31 will pass beyond the outer annular projection 28 in the body 11 and the two projections 32 and 38 will snap then in the associated grooves 27 and 33 whereby the member 30 will remain locked on the member 10, however with a capacity to rotate.

At this point the portion 26 having a substantially square cross-section of the member 10 is in register with the portion 34 having a substantially square cross-section of the member 30 and the cap can be inserted in the filler whereby its square portions 34 and 26 in register with one another can enter the opening 43 having a substantially square cross-section of the diaphragm 42 of the filler.

If the cap is rotated now by means of its handle 22 in a clockwise direction in the filler 40, i.e. in a counterclockwise direction looking at FIG. 6, since the counterclockwise direction is not allowed by the stop elements 45 of the filler abutting the sides of the square, it will be seen that the square portions 26 and 34 will rotate by 45° and then will impinge on the stop corners 45 of the filler. The cap cannot rotate beyond this 45° arc.

At this point the cap 10-30 is secured to the filler, but it can be removed by effecting a contrary 45° rotation. If now the lock is rotated by means of the key C in a conterclockwise direction by 45° i.e. in a clockwise direction in FIG. 6, it will be seen that the pin 59 will rotate the square portion 34 of the member 30 by 45° until its sides abut the stop means 45 of the filler. At this point the square portions 34 and 26 will be positioned as shown in FIG. 7 and the cap cannot be rotated any longer and therefore it cannot be removed any longer.

The advantage of this cap is that the lock is fully sealed in the cap and therefore it is not exposed to gasoline vapors which could damage it. In addition, by means of the special configuration of the square portions with rounded corners and the cooperation of the stop means on the filler it is achieved that the cap can be rotated in a single direction by 45° and then rotated in the original position in an opposite direction by 45°.

Another peculiarity of the cap and filler assembly of the invention is that it can serve as a cap alone without lock by omitting the member 30 and closing the hole 20 with a little plastic cap.

While but one embodiment of the invention has been described, it is obvious that a number of changes and modifications can be made in it without departing from the scope of the invention. In particular the square portions with rounded corners could take other forms which limit the rotation of the cap to 45°.

What I claim is:

1. A cap and filler assembly for fuel tanks of automotive vehicles, characterized in that the cap comprises substantially a pair of hollow cylindrical members of plastic material, one of which has at one end a control means and a circular flange for the closure of the filler opening and at the other end first snap means for engaging and retaining a cylinder lock and second snap means for receiving a complementary portion of the other of said hollow cylindrical members, said one hollow cylindrical member having also another cylindrical wall intergrally formed with said flange and terminating with a substantially square cross-section, whereas said other hollow cylindrical member has at one end snap means for engagement with the snap means of said one hollow cylindrical member and at the other end an integral cap portion having the same square cross-section as the square cross-section portion of said hollow cylindrical member and a seat for receiving the end of said cylinder lock, both of said hollow cylindrical members, when connected by snap action to each other being capable of being rotated with respect to each other by said cylinder lock, and the filler comprises a diaphragm provided with an opening having the same square cross-section as the square cross-section of the portions of the pair of members forming said cap.

2. A cap and filler assembly as claimed in claim 1, characterized in that said portions of substantially square cross-section of the first and second cap members and of filler have a square cross-section with rounded corners, the diagonally opposed ones of the rounded corners having a different curvature radius.

3. A cap and filler assembly as claimed in claim 1, characterized in that the filler is provided on the inner wall thereof with stop means in order to limit the rotation of the pair of cap members to an angle of 45°.

4. A cap and filler assembly as claimed in claim 2, characterized in that said curvature radius of two diagonally opposed corners is twice the curvature radius of the other diagonally opposed corners.

* * * * *